United States Patent Office 3,404,959
Patented Oct. 8, 1968

3,404,959
B$_{20}$H$_{16}$ AND ITS PREPARATION
Norman E. Miller, Wilmington, Del., assignor to E. I. du Pont de Nemours and Company, Wilmington, Del., a corporation of Delaware
No Drawing. Filed Aug. 7, 1963, Ser. No. 300,704
1 Claim. (Cl. 23—204)

ABSTRACT OF THE DISCLOSURE

Eicosaborane(16) which has the formula B$_{20}$H$_{16}$. It is prepared by reacting B$_{10}$H$_{14}$ with an alkylaminodialkylborane catalyst at elevated temperatures of at least 175° C. The compound is useful as a reducing agent for metals.

This invention relates to a new compound of boron and hydrogen and to its preparation.

Compounds of boron and hydrogen have achieved technical importance in recent years, particularly in applications employing oxidizing or reducing agents. The boron hydrides used in these fields are compositions in which the atomic ratio of hydrogen to boron is greater than 1. Pure volatile compounds consisting solely of boron and hydrogen in which the atomic ratio of hydrogen to boron is less than 1 are unknown and properties of this type of compound cannot be forecast with assurance.

There has now been discovered a chemical compound composed solely of boron and hydrogen in which the atomic ratio of hydrogen to boron is less than 1. The compound of the present invention is hexadecahydroeicosaborane(16), or more simply, eicosaborane(16), and has the formula B$_{20}$H$_{16}$. It is prepared by contacting decaborane(14), i.e., B$_{10}$H$_{14}$, with an alkylaminodialkylborane catalyst at elevated temperatures.

The novel compound, B$_{20}$H$_{16}$, is a white crystalline solid which sublimes when heated under reduced pressure. When heated in a sealed tube it melts at 196–199° C.

The compound is soluble in hydrocarbons, e.g., pentane, cyclohexane, and the like; and in halogenated hydrocarbons, e.g., chloroform, carbon tetrachloride, tetrachloroethylene and related solvents. The compound can be recovered unchanged from these solvents.

B$_{20}$H$_{16}$ dissolves with reaction in hydroxyl-bearing compounds, e.g., water, alcohols, and the like, forming solutions which are strongly acidic. The compound cannot be recovered unchanged from these solvents. B$_{20}$H$_{16}$ also dissolves in amines and ammonia with reaction to form compositions containing nitrogen and boron.

The compound is hygroscopic and, if exposed to moist air, will absorb sufficient moisture to form a strongly acidic solution. In view of its hygroscopic properties, B$_{20}$H$_{16}$ is preferably stored in containers from which moist air is excluded by appropriate methods. Under these conditions the compound is stable for prolonged periods at conventional atmospheric temperatures and pressures. The containers are preferably made of corrosion-resistant material customarily employed for storing chemical products, e.g., glass, stainless steel, poly(tetrafluoroethylene) resin, and the like.

B$_{20}$H$_{16}$ is prepared by passing B$_{10}$H$_{14}$ into a reaction zone at a temperature of at least 175° C. in the presence of a catalyst which is an alkylaminodialkylborane of the formula R$_2$BNHR, where R is an alkyl group, preferably lower alkyl, and most preferably of 1–3 carbons, inclusive. The reaction preferably is conducted in the substantial absence of oxygen and water.

Decaborane, employed as the principal reactant, is a well-known compound and is available commercially. It can be employed as purchased without further purification. The catalyst, i.e., the alkylaminodialkylborane, can be prepared by methods described in the literature [Wiberg and Hertwig, Zeit. anorg. u. allgem. chem. 255, 169 (1947)]. Methylaminodimethylborane

[(CH$_3$)$_2$BNHCH$_3$]

is an especially preferred catalyst.

The process is most conveniently conducted in vessels conventionally employed for pyrolysis or thermal decompositions. A tube of corrosion-resistant and heat-resistant material can be used to provide a reaction zone which is heated by any suitable means to at least 175° C. The portion of the tube in which the reaction takes place can, if desired, be charged with refractory material (e.g., beads, rings, small tubes, and the like) to provide a large area of surface of contact for the reactants. The reaction chamber is connected at one end to a source of supply for decaborane and for the alkylaminodialkylborane. The other end of the reaction chamber is connected with an outlet tube for disposal of exit gases. This tube generally passes through a cooled trap to a vacuum line or vacuum pump.

The reactants can be fed into the reaction zone separately or they can be mixed to form a heterogeneous mass which is supplied to the reaction zone. The ratio in which the reactants are used is not critical but for maximum yield of B$_{20}$H$_{16}$ it is preferred to use from 3–8% by weight of the catalyst based on the decaborane.

In the operation of the process the reaction chamber is preferably freed of air and moisture by reducing the internal pressure to 1 mm. of mercury or less by means of the vacuum pump. The reaction zone is heated to the desired temperature and the reactants are passed into the heated zone at a moderate rate. The rate of passage is not critical and it will be determined by other factors, e.g., size of reaction zone, packing in the zone, temperature of reaction, and the like. The B$_{20}$H$_{16}$ generally condenses to a white crystalline solid in the area immediately beyond the heated zone, and unreacted B$_{10}$H$_{14}$ collects at the exit end or near it. The crystalline appearances of the two compounds are dissimilar and no difficulty is experienced in distinguishing the compounds by visual means.

The temperature in the reaction zone will generally lie between about 175° C. and 600° C. Preferably, the temperature is between about 250° C. and 450° C. The time in the reaction zone is not critical. It is generally very short but, as in any continuous flow process, the time for maximum yield of product will be based to some extent on shape and size of the zone, temperature and area of surface for hot contact. The time generally will lie between about 0.05 and 10 seconds. Preferably the time lies between about 0.1 and 5 seconds.

The pressure in the reaction zone is not critical. The operation is most conveniently conducted at a pressure of less than 1 atmosphere to permit, as noted earlier, easy removal of air (oxygen) and moisture and to facilitate feeding of the reactants. However, it is not essential for operability to conduct the reaction at reduced pressure. The reaction zone can, if desired, be flushed with a dry inert gas (argon, helium and the like) and the reactants can be supplied under pressure.

After passage of the reactants is complete, the reaction zone is cooled, and, in the event of operation under reduced pressure, an inert gas is passed into the reaction chamber to restore the pressure to about one atmosphere. The reaction chamber is opened and the B$_{20}$H$_{16}$ is removed as rapidly as possible with minimum exposure to moist air. It can be collected directly into a solvent, e.g., pentane, from which it can be recrystallized. The product as collected from the reaction zone is generally pure enough to be used without further processing. The following examples illustrate the compound and its preparation in more specific detail.

Example 1

A vertical glass reaction tube (20 mm. x 250 mm.) is charged with quartz rings and fitted with a clamp-on electric heater. The upper end of the tube is connected to a dropping funnel and the lower end of the tube is connected to a U-shaped piece of glass tubing which is immersed in a trap cooled to about −78° C. The glass tubing is connected to a vacuum pump. Pressure in the reaction chamber is reduced to a low value (less than 0.1 mm. of Hg) and the area which contains the quartz rings is heated to a temperature of 350° C. The dropping funnel is charged with a mixture of 0.5 g. of $$(CH_3)_2BNHCH_3$$

and 0.5 g. of $B_{10}H_{14}$. This mixture forms a fluid paste. The dropping funnel is opened partially and the paste is dropped into the heated reaction zone over a period of about 1 hour. Unreacted $B_{10}H_{14}$ passes into the tube immersed in the cooled trap and is condensed there. The $B_{20}H_{16}$ collects on the walls of the exit tube immediately beyond the reaction chamber. After addition of the paste is completed, the reaction vessel is cooled, the vacuum pump is stopped and argon gas is admitted into the reaction vessel to restore the pressure to atmospheric. The exit tube is removed from the reaction vessel and the $B_{20}H_{16}$ is scraped into a receiver as rapidly as possible with minimum exposure to air. The product is substantially pure, melting at about 200° C. It is further purified by subliming in a closed evacuated tube to obtain a material which softens at 186° C. and melts completely at 195° C.

The identity of the compound is confirmed by its infrared absorption spectrum.

Example 2

(A) A horizontal reaction chamber is employed which is a glass tube approximately 20 mm. in diameter and 500 mm. in length. The middle of the tube is fitted with a clamp-on electric heater of about 150 mm. length. The inlet end of the chamber is connected with a source of $B_{10}H_{14}$ and to a source of freshly prepared $$(CH_3)_2BNHCH_3$$

The exit end of the chamber is connected with a tube which passes through a trap cooled to about −196° C. and is connected to a vacuum pump. Pressure in the reaction chamber is reduced to a low value (less than 0.1 mm.) and the temperature in the reaction zone is raised to 325° C. Slow passage of the catalyst into the zone is started followed by passage of decaborane at 100° C. using a flow rate of 1.0–1.5 g. of $B_{10}H_{14}$ per hour. The catalyst flow rate is about 4–5% of the $B_{10}H_{14}$ flow rate. Passage of the reactants is continued until about 20 g. of $B_{10}H_{14}$ has passed through the chamber (about 14 hours). The $B_{20}H_{16}$ collects on the walls of the tube immediately beyond the heated zone. Unreacted $B_{10}H_{14}$ collects on the walls near the exit end of the tube and is distinguished readily by its different crystal structure from $B_{20}H_{16}$. The reaction chamber is cooled to atmospheric temperature, the vacuum pump is stopped and sufficient argon gas is admitted to restore the pressure in the system to one atmosphere. The reaction chamber is opened at the exit end, the unreacted $B_{10}H_{14}$ is removed first and 1.4 g. of $B_{20}H_{16}$ which lies nearer the center of the chamber is then collected in a receiver with minimum exposure to moisture. It is purified by crystallization from carbon tetrachloride or pentane and by sublimation.

(B) The process of Part A is repeated, employing a total of 35 g. of $B_{10}H_{14}$ in the reaction over a longer period of time and 2.3 g. of $B_{20}H_{16}$ is obtained.

Elemental analyses of the product are as follows:

*Analysis.*—Calc'd for $B_{20}H_{16}$: B, 93.0; H, 6.94. Found: B, 92.9, 92.5; H, 7.1, 7.3.

The infrared spectrum of the compound, determined in a Nujol mull, shows the following absorption bands (expressed as cm.$^{-1}$): 2580, strong; 960, strong; 915, weak; 905, weak; 890, weak; 870, medium; 840, weak; 790, medium; 765, weak; and 720, strong (triplet).

The proton nuclear magnetic resonance spectrum, determined in carbon tetrachloride, shows four broad unsymmetrical lines not quite equally spaced which, on simultaneous irradiation of the boron atoms at 19.2 mc., collapse to two nearly equivalent sharp peaks at 165 c.p.s. and 205 c.p.s. downfield from tetramethylsilane.

The $B^{11}$ nuclear magnetic resonance spectrum shows three broad peaks at 19.2 mc. of approximate area ratios of 1/1.25/1 at 142 c.p.s., 342 c.p.s. and 500 c.p.s. upfield from trimethyl borate. On irradiation of the hydrogen atoms at 60 mc. the $B^{11}$ spectrum consists of two nearly equivalent peaks at 139 c.p.s. and 280 c.p.s. and a large peak at 404 c.p.s., all upfield from trimethyl borate.

The mass spectrum of the compound shows a cluster of peaks of which the largest is around 232 and the highest number is 236.

The neutralization equivalent of the compound, determined in aqueous solution, is 116±2 and the molecular weight, calculated from this equivalent, is 232±4. The titration curve shows a single break at pH=6.

The process illustrated in Examples 1 and 2 is generic for the preparation of $B_{20}H_{16}$ employing an alkylaminodialkylborane as a catalyst. Examples of other catalysts which can be employed include ethylaminodiethylborane, propylaminodipropylborane, and the like.

The compound $B_{20}H_{16}$ is decomposed by platinum black catalyst in acid solution. Quantitative decomposition of the compound, employing platinum black catalyst saturated with hydrogen, yields 164.0±0.8 millimoles of $H_2$ per gram of $B_{20}H_{16}$. The calculated value is 163.8. The compound can, therefore, be used as a source of hydrogen.

The compound is also useful as a drying agent to remove traces of moisture from gases or it can be supplied to confined areas to keep these areas free of moisture. It can be used to remove traces of volatile amines of disagreeable odor from air by passing the air over the $B_{20}H_{16}$.

The compound is useful as a component of compositions for flares and fireworks. It can be used in combination with oxidizing agents, e.g., ammonium nitrate, lithium perchlorate, sodium nitrate, strontium nitrates, and the like to provide the desired color and propulsive effect.

The compound in aqueous solution is useful as a reducing agent for various metals, e.g., nickel, silver and gold. To ilustrate, an aqueous solution of $Ni(NH_3)_6Cl$ is added to an aqueous solution of $B_{20}H_{16}$ at about 25° C. No precipitate forms at this point. The mixture is heated to boiling and a black precipitate containing elemental nickel separates. As a further illustration, an aqueous solution of silver nitrate is added to an aqueous solution of $B_{20}H_{16}$ and a pure white precipitate of a silver salt forms immediately. It turns dark on standing in daylight. An aqueous solution of $HAuCl_4$ is added to an aqueous solution of $B_{20}H_{16}$ and a black precipitate of elemental gold separates.

As many apparently widely different embodiments of this invention may be made without departing from the spirit and scope thereof, it is to be understood that this invention is not limited to the specific embodiments thereof.

The embodiments of the invention in which an exclusive property or privilege is claimed are defined as follows:

1. A boron hydride having the empirical formula $B_{20}H_{16}$ and characterized
   (i) by an infrared spectrum determined in a Nujol mull: 2580 cm.$^{-1}$ (strong), 960 cm.$^{-1}$ (strong), 915 cm.$^{-1}$ (weak), 905 cm.$^{-1}$ (weak), 890 cm.$^{-1}$ (weak), 870 cm.$^{-1}$ (medium), 840 cm.$^{-1}$ (weak), 790 cm.$^{-1}$ (medium), 765 cm.$^{-1}$ (weak), 720 cm.$^{-1}$ (strong, triplet);

(ii) by a proton nuclear magnetic resonance determined in carbon tetrachloride consisting of four broad unsymmetrical lines not quite equally spaced which, on simultaneous irradiation of the boron atoms at 19.2 mc., collapse to two nearly equivalent sharp peaks at 165 c.p.s. and 205 c.p.s. downfield from tetramethylsilane;

(iii) by a B$^{11}$ nuclear magnetic resonance spectrum at 19.2 mc. of three broad peaks of approximate area ratios of 1/1.25/1 at 142 c.p.s., 342 c.p.s. and 500 c.p.s., and on irradiation of hydrogen atoms at 60 mc. consisting of two nearly equivalent peaks at 139 c.p.s. and 280 c.p.s. and a large peak at 404 c.p.s. all upfield from trimethyl borate;

(iv) by a neutralization equivalent in aqueous solution of 116±2;

(v) by a titration curve showing a single break at pH=6;

(vi) by being hygroscopic; and (vii) by melting in a sealed tube at 196–199° C.

References Cited

UNITED STATES PATENTS

| | | | |
|---|---|---|---|
| 656,354 | 7/1900 | Jacobs | 23—204 |
| 2,967,140 | 1/1961 | Cromwell | 204—164 |
| 3,152,867 | 10/1964 | Tyson | 23—204 |

OTHER REFERENCES

Hall et al.: "Journal of the American Chemical Society," vol. 84, pp. 4205–4207 (Nov. 20, 1962).

Grimes et al.: "Chemical Abstracts," vol. 56, columns 1127–1128 (January 1962).

Friedman et al.: "Journal of the American Chemical Society," vol. 85, p. 3505 (1963).

OSCAR R. VERTIZ, *Primary Examiner.*

G. PETERS, *Assistant Examiner.*